(12) United States Patent
Gonzalez et al.

(10) Patent No.: US 12,386,325 B2
(45) Date of Patent: Aug. 12, 2025

(54) STAGGERED COOLING SYSTEM CONTROLS FOR BATTERY ENERGY STORAGE SYSTEMS

(71) Applicant: Inventus Holdings, LLC, Juno Beach, FL (US)

(72) Inventors: Sabrena Gonzalez, Jupiter, FL (US); Kiran Kambly, Jupiter, FL (US); Richard Clark, Palm Beach Gardens, FL (US); John Stauffer, Jupiter, FL (US); Krishnakumar Venikataraman, Lake Worth, FL (US)

( * ) Notice: Subject to any disclaimer, the term of this patent is extended or adjusted under 35 U.S.C. 154(b) by 530 days.

(21) Appl. No.: 17/731,928

(22) Filed: Apr. 28, 2022

(65) Prior Publication Data
US 2023/0350364 A1   Nov. 2, 2023

(51) Int. Cl.
*G05B 19/042* (2006.01)

(52) U.S. Cl.
CPC .... *G05B 19/042* (2013.01); *G05B 2219/2639* (2013.01); *G05B 2219/50333* (2013.01)

(58) Field of Classification Search
USPC ....................................................... 700/295
See application file for complete search history.

(56) References Cited

U.S. PATENT DOCUMENTS

| | | | |
|---|---|---|---|
| 5,257,463 A * | 11/1993 | Wheeler | H01M 10/6563 165/80.2 |
| 9,292,013 B2 | 3/2016 | Keil et al. | |
| 9,292,031 B2 | 3/2016 | Beyerle et al. | |
| 9,362,750 B2 | 6/2016 | Kang | |
| 9,413,193 B2 | 8/2016 | Park et al. | |
| 9,553,451 B2 | 1/2017 | Zacharchuk et al. | |
| 10,069,300 B2 | 9/2018 | Lenox | |
| 10,128,544 B2 | 11/2018 | Cutright et al. | |
| 10,333,307 B2 | 6/2019 | Hooshmand et al. | |
| 10,497,072 B2 | 12/2019 | Hooshmand et al. | |
| 10,614,146 B2 | 4/2020 | Song et al. | |
| 10,634,725 B2 | 4/2020 | Asghari et al. | |
| 10,680,455 B2 | 6/2020 | Hooshmand et al. | |
| 10,901,476 B2 | 1/2021 | Youn et al. | |
| 10,909,642 B2 | 2/2021 | Elbsat et al. | |
| 11,036,249 B2 | 6/2021 | Elbsat | |
| 11,137,731 B2 | 10/2021 | Elbsat et al. | |
| 11,545,848 B1 * | 1/2023 | Hansen | H02J 7/007194 |
| 2012/0053741 A1 | 3/2012 | Beyerle et al. | |

(Continued)

*Primary Examiner* — Emilio J Saavedra
(74) *Attorney, Agent, or Firm* — Fleit Intellectual Property Law; Jon Gibbons

(57) ABSTRACT

Disclosed is a system and method for smart control of cooling systems to optimize cooling utilization such that demand charges can be avoided. The present invention groups battery energy storage systems (BESS) containers into multiple individual blocks. The cooling units of individual blocks are staggered to turn ON/OFF with a time delay such that: i) cooling load of each block is below the demand load; ii) if the cooling load of a given block exceeds the demand load (ex: 500 kilowatts), the turn-on time during the demand charge hour is not to exceed the demand charge time limit (example: 15 minutes); iii) No two blocks are operating at the same time; iv) the staggered time limits are to be determined based on real-time monitoring of BESS; and BESS containers' internal temperatures such that they do not exceed a set temperature.

20 Claims, 10 Drawing Sheets

(56) References Cited

U.S. PATENT DOCUMENTS

| | | |
|---|---|---|
| 2012/0059527 A1 | 3/2012 | Beaston et al. |
| 2017/0310140 A1 | 10/2017 | Asghari et al. |
| 2017/0366037 A1* | 12/2017 | Hicks ................ H02J 3/32 |
| 2019/0079473 A1 | 3/2019 | Kumar et al. |
| 2019/0137956 A1 | 5/2019 | Hooshmand et al. |
| 2020/0143491 A1 | 5/2020 | Turney et al. |
| 2020/0202459 A1 | 6/2020 | Chow et al. |
| 2021/0116954 A1* | 4/2021 | Walsh ................ H02J 3/144 |
| 2021/0136946 A1* | 5/2021 | Welser ................ H01M 8/00 |
| 2021/0318707 A1 | 10/2021 | Dyess et al. |
| 2021/0325067 A1 | 10/2021 | Hoff |
| 2023/0221028 A1* | 7/2023 | Brahme ................ F24F 11/46 |

\* cited by examiner

STAGGERED COOLING SYSTEM CONTROLS FOR BATTERY ENERGY STORAGE SYSTEMS

FIELD OF THE DISCLOSURE

The present invention generally relates to the field of managing a power grid and, more particularly to managing cooling systems for battery energy storage systems (BESS).

BACKGROUND

A Battery Energy Storage System (BESS) is a device that enables energy from renewables, like solar and wind, to be stored and then released when customers need power most. BESS is often in the form of containers with storage elements and electronics to control switches. BESS requires internal temperature to be maintained between specific thresholds to meet contractual obligations, for example between 23 degrees Celsius and 28 degrees Celsius. BESS requires internal temperature to be maintained between T1 degrees Celsius and T2 degrees Celsius (T1<T2) to meet contractual obligations. Temperatures inside the BESS are maintained by operating cooling systems fitted to the BESS containers.

Demand charges are additional fees that utilities charge non-residential or commercial customers for maintaining a constant supply of electricity. These fees usually amount to a substantial sum of money that businesses must pay on monthly electric bills. They can be as much as fifty percent of the total electric bill or more. Demand charges apply when X kilowatt peak demand load is recorded for more than Y minutes during the defined demand charge times, where the power provider sets X and Y. For example, between 4 PM to 9 PM during summer months, a peak demand load of 500 kilowatts recorded for more than 15 minutes during every hour will trigger a demand charge for the entire hour.

Unfortunately, having the cooling ON cycle will result in demand charge rates during the demand charge hours. Operating costs for BESS cooling are significantly higher during the demand charge hours of summer months.

SUMMARY OF THE INVENTION

The present invention provides a novel method and system for smart control of cooling battery energy storage systems (BESSs) to optimize cooling utilization such that demand charges can be avoided. The method begins with accessing an electric energy center with a plurality of BESSs, each with an associated cooling system. Next, the associated cooling system for at least one of the plurality of BESSs is turned ON for a settable time interval, where the settable time interval is based on a demand charge time limit. Typically, the demand charge time limit is specified by an electric utility provider for a site with a plurality of BESSs. The demand charge time limit changes depending on one of a time of day, a day of a year, outside ambient temperature, or a combination thereof. Finally, the associated cooling system is turned OFF for another settable time interval.

In another example, the present invention provides a novel system and method for smart control of cooling battery energy storage systems (BESSs) to optimize cooling utilization such that demand charges can be avoided. The method begins by accessing an electric energy center with a plurality of BESSs, each with an associated cooling system. Next, the plurality of BESSs are divided into distinct, non-overlapping groups of two or more individual blocks in which each of the individual blocks includes one or more BESS, whereby the divisions is based on i) a total cooling load for each individual block, ii) a temperature inside the BESS, iii) an electrical distribution layout in the electric energy center, iv) a thermal distribution layout of the associated cooling system, or v) a combination thereof. In one example, the plurality of BESSs is divided based on a total cooling load being less than a demand charge limit. In another example, the plurality of BESSs are divided is further based on a temperature inside each BESS that is outside a settable temperature range. The individual blocks may include subsets of blocks. Typically, the electrical distribution layout in the electric energy center is based on breakers, feeders, load centers, one or more electrical devices that distribute electricity at the electric energy center, or a combination thereof.

Next, one individual block out of the two or more individual blocks is selected. The associated cooling system for the selected individual block is turned ON, while the associated cooling system for each non-selected individual block is OFF.

Next, the associated cooling system with the one individual block selected is turned OFF in response to i) a settable time interval expiring, ii) an internal temperature for each BESS in the selected one individual block selected being within a thermal operating range, iii) an internal temperature of each BESS in each unselected block being outside a thermal operating range, or iv) a combination thereof.

The steps above are typically repeated for each cooling cycle.

In another example, prior to selecting one individual block out of the two or more individual blocks, an internal temperature of the BESS in each of the non-overlapping groups of two or more individual blocks is accessed. Next, in response to the internal temperature of the BESS in each of the non-overlapping groups of two or more individual blocks being above the thermal operating range, operating the associated cooling system until the internal temperature is within the thermal operating range prior to operating each of the individual blocks.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
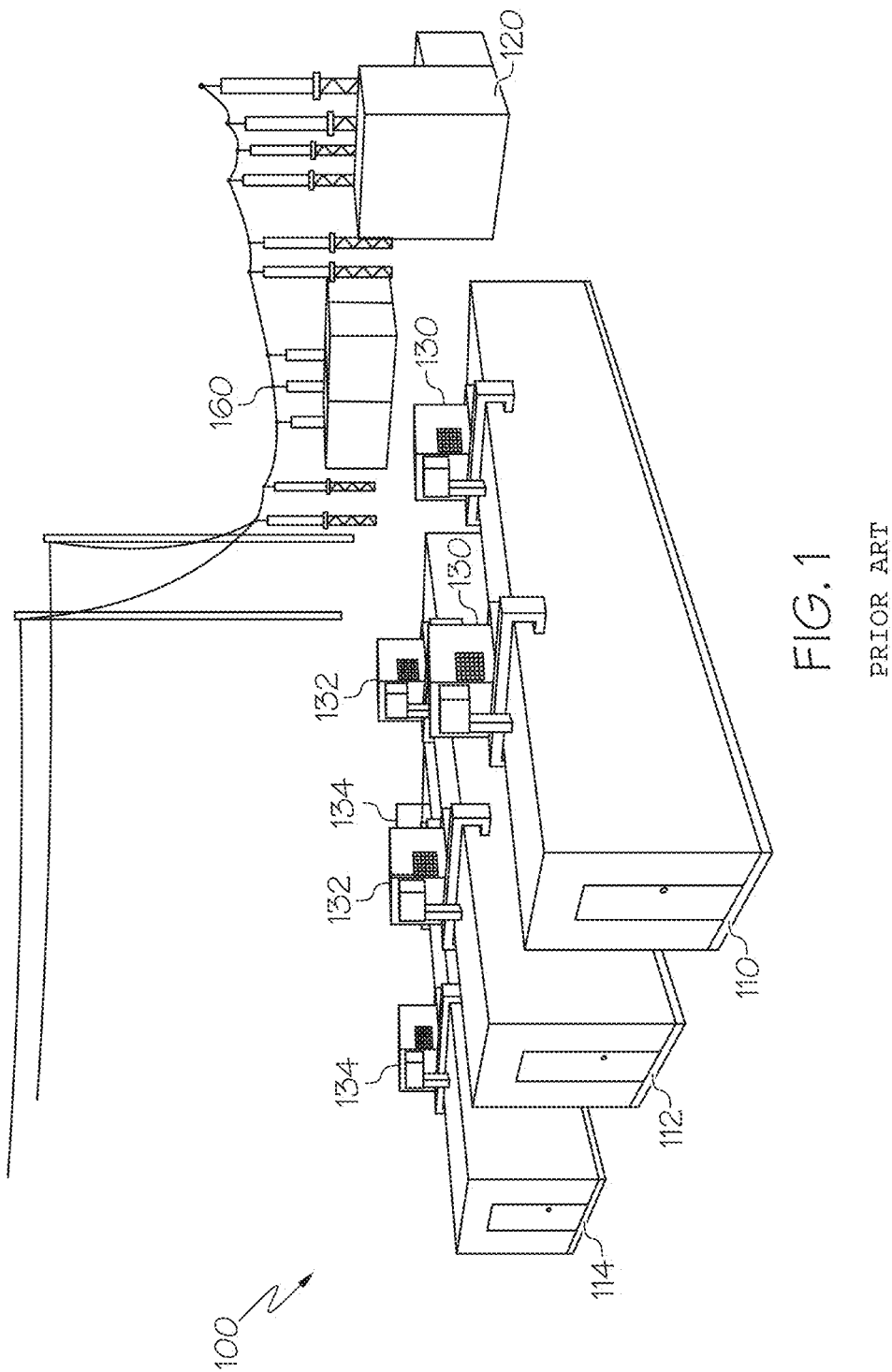
FIG. 1 illustrates an electric energy center with battery storage systems as part of a renewable energy installation, according to the prior art.

As required, detailed embodiments are disclosed herein; however, it is to be understood that the disclosed embodiments are merely examples and that the systems and methods described below are embodied in various forms. Therefore, specific structural and functional details disclosed herein are not to be interpreted as limiting but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

Non-Limiting Definitions

Generally, the terms "a" or "an", as used herein, are defined as one or more than one. The term plurality, as used herein, is defined as two or more than two.

The term "adapted to" describes the hardware, software, or a combination of hardware and software that is capable of, able to accommodate, to make, or that is suitable to carry out a given function.

The term "another", as used herein, is defined as at least a second or more.

The term "battery" means any electrochemical device to provide electric power including lead-acid batteries, alkaline, nickel oxyhydroxide, zinc-air, silver-oxide, magnesium, lithium-ion batteries, a one or more combinations of battery technologies.

The term "battery energy storage systems" or BESS are rechargeable battery systems that store energy from renewable energy sources, like wind and solar power or the electric grid, and provide that energy to a home or business. BESS often has controllers and algorithms to coordinate energy production, and computerized control systems are used to decide when to keep the energy to provide reserves or release it to the grid. BESS can efficiently perform certain tasks that used to be difficult or impossible, such as peak shaving and load shifting.

The term "cooling system" includes air conditioning (AC) units, evaporative coolers, geothermal cooling, forced ventilation, heat exchangers, chilled water, or liquid systems.

The term "configured to" describes hardware, software or a combination of hardware and software that is adapted to, set up, arranged, built, composed, constructed, designed, or that has any combination of these characteristics to carry out a given function.

The term "coupled," as used herein, is defined as "connected," although not necessarily directly, and not necessarily mechanically.

The term "demand charges" means are for the highest level of electricity demand during a billing period ("peak demand") and are measured in kilowatts (kW). Demand charges are not typically charged to residential customers. Commercial and industrial electricity customers are typically billed for energy in two distinct ways: consumption charges and demand charges. Demand charges can be as much as fifty percent of the total electric bill or more. Demand charges apply when X kilowatt peak demand load is recorded for more than Y minutes during the defined demand charge times, where the power provider sets X and Y.

The phrase "electrical distribution layout" in the electric energy center is one or more electrical devices that distributes electricity, for example any combination of breakers, feeders, and load centers.

The terms "including" and "having," as used herein, are defined as comprising (i.e., open language).

The term "ON" means the cooling system is energized to cool a BESS, whereas the term "OFF" means the cooling system is not energized to cool the BESS.

The term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

It should be understood that the steps of the methods set forth herein are not necessarily required to be performed in the order described, and the order of the steps of such methods should be understood to be merely exemplary. Likewise, additional steps may be included in such methods, and certain steps may be omitted or combined in methods consistent with various embodiments of the present device.

Although the elements in the following method claims, if any, are recited in a particular sequence with corresponding labeling unless the claim recitations otherwise imply a particular sequence for implementing some or all of those elements, those elements are not necessarily intended to be limited to being implemented in that particular sequence.

Overview

The present invention reduces or eliminates demand charges for BESS with cooling systems. In order to eliminate or reduce demand charges, the present invention stays below this time limit. For example, X kilowatt peak load being used for over Y minute, where the power provider sets X and Y.

The present invention is not limited to cooling systems, and any cooling systems may be used, including liquid, geothermal, and other refrigeration systems. The present invention includes an algorithm that implements all or a few of the following conditions depending on site conditions and demand charge applicability.

The present invention groups BESS containers into multiple individual blocks.

The cooling units of individual blocks are staggered to turn ON/OFF with a time delay such that:
a. cooling load of each block is below the demand load;
b. If the cooling load of a given block exceeds the demand load (ex: 500 kilowatts), the turn-on time during the demand charge hour is not to exceed the demand charge time limit (example: 15 minutes);
c. No two blocks are operating at the same time;
d. The staggered time limits are to be determined based on real-time monitoring of BESS; and
e. BESS containers' internal temperatures such that they do not exceed 28 degrees Celsius.

Battery Energy Storage System

FIG. 1 illustrates an electric energy center 100 with battery storage systems (BESSs) as part of a renewable energy installation, according to the prior art. This electric energy system has various electrical components, including lines, switch units, busbars, transformers, isolators, reactors, and other electrical components. More specifically, generally shown are BESSs 110, 112, 114 with associated cooling systems 130, 132, 134. The BESS in this example is packaged as in an intermodal container or shipping container, such as a standard shipping container. Since shipping containers are designed for intermodal freight transport, these containers can be moved easily between ship, rail, and truck. Each BESSs may be electrically coupled to a power conversion system (PCS) 120. The PCS is a bi-directional inverter with harmonic filters for converting DC voltage from each BESSs 110, 112, 114 to AC voltage to be compatible with the power grid 160, may need to be repaired or replaced. FIG. 3 is a typical energy management system at a BESS. More details of each BESSs 110, 112, 114 is described in FIG. 2.

Figure 2:
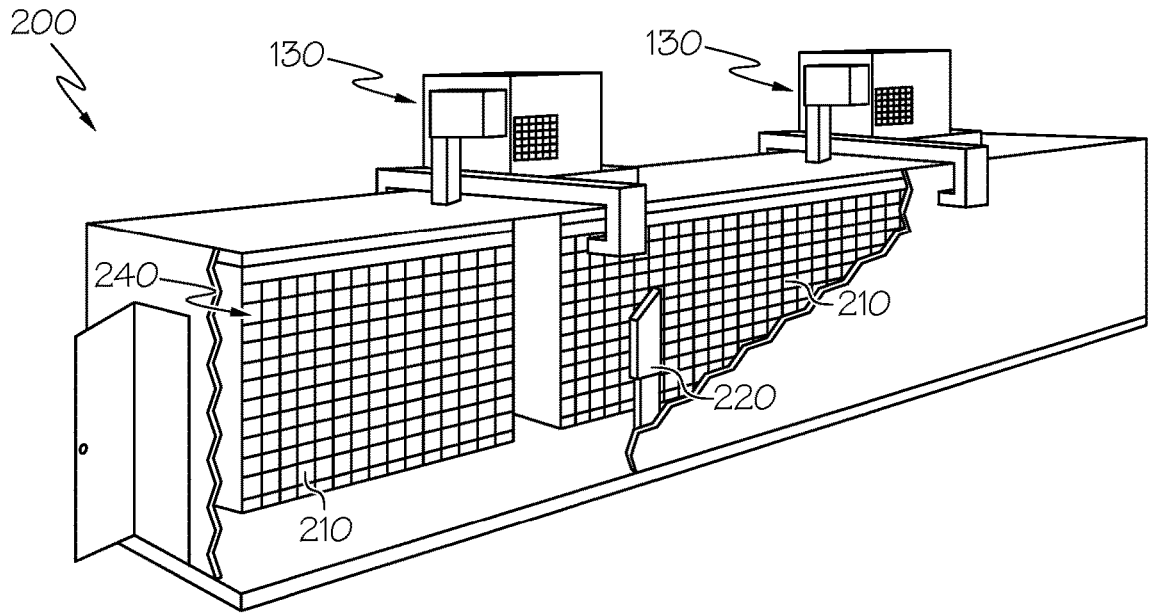
FIG. 2 illustrates an example of the major electrical components of a BESS of FIG. 1, according to one aspect of the present invention.
Figure 3:
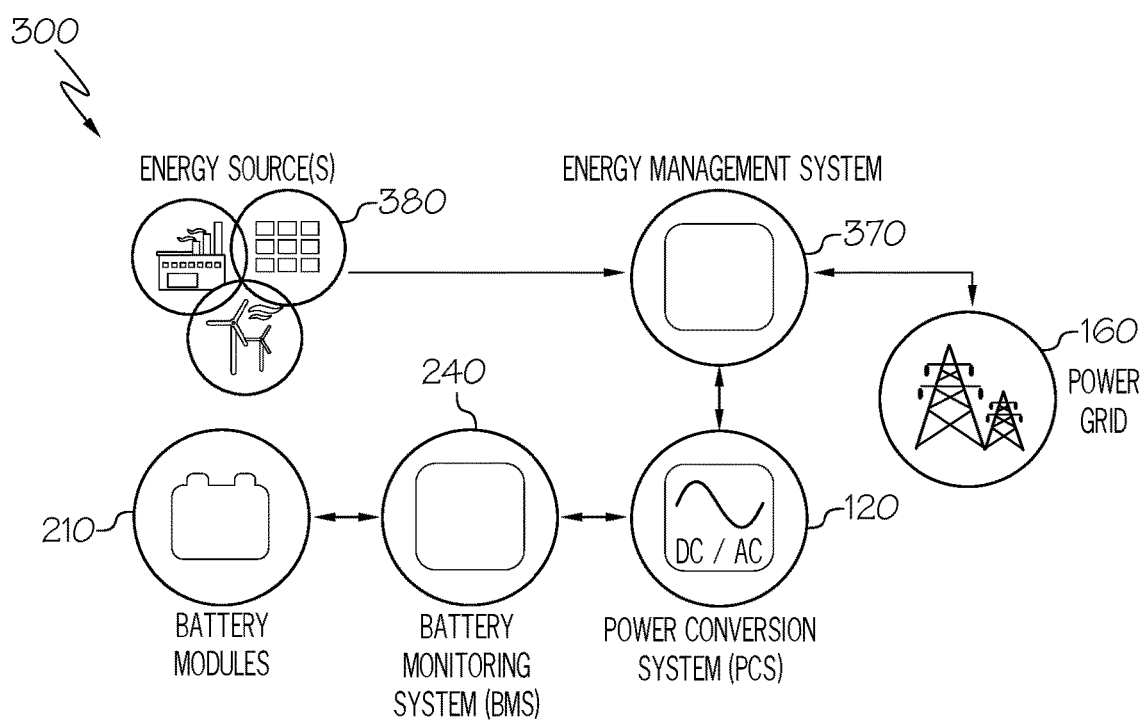
FIG. 3 illustrates the major electrical components of a distributed power grid, according to one aspect of the present invention.

Turning now to FIG. 2 illustrates an example of the major electrical components 200 of a BESS 110 of FIG. 1, according to one aspect of the present invention. The BESS includes one or more batteries 210 using any battery technology know or developed in the future. Also shown is a battery monitoring system 240. The battery monitoring system 240 is a local control for the charging and discharging of batteries 210. The battery monitoring system 110 is typically communicatively coupled with an energy management 370, which is further described below. Each battery monitoring system 240 in one embodiment locally controls the cooling system 130 for the BESS 110.

FIG. 3 illustrates the major electrical components of a distributed power grid 300, according to one aspect of the present invention. Various power energy sources 380 are shown, including renewable energy sources such as wind and solar as well as conventional energy sources, natural gas, coal, and nuclear. The power from the power sources 380 is delivered to power grid 160. The energy management system 370 controls how much power is delivered from power sources 380 to the grid and from BESS 110 to the grid. The power grid 160 could receive one-hundred percent of the power from the energy sources 380 or one-hundred percent of the power from the BESS 110 or some combination of power from both the energy sources 380 and the BESS 110.

Transient Cooling Model

Figure 4A:
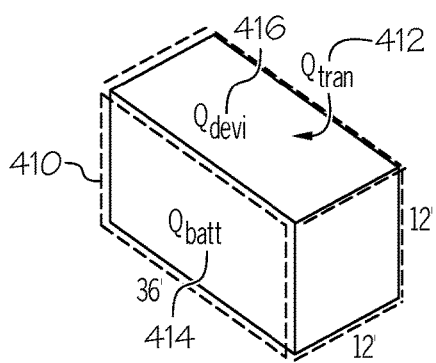
FIG. 4A is a model of a total cooling load with the sub-components for an enclosed space.
Figure 4B:
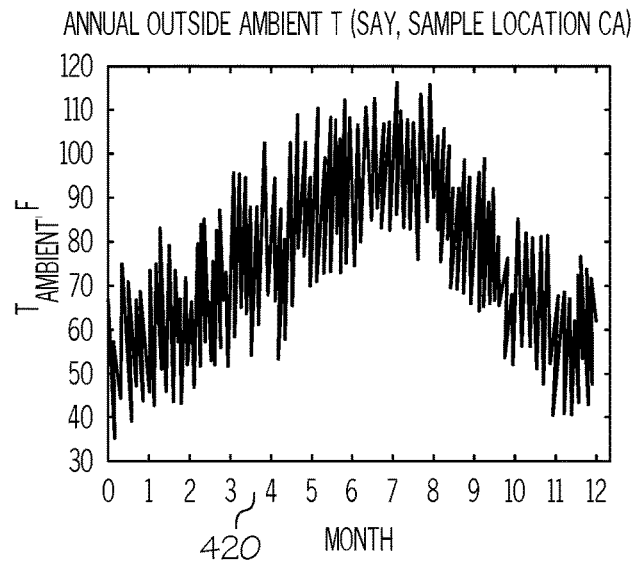
FIG. 4B is a graph of outside ambient temperature fluctuations over twelve months for a given geographic area, according to one aspect of the present invention.
Figure 4C:
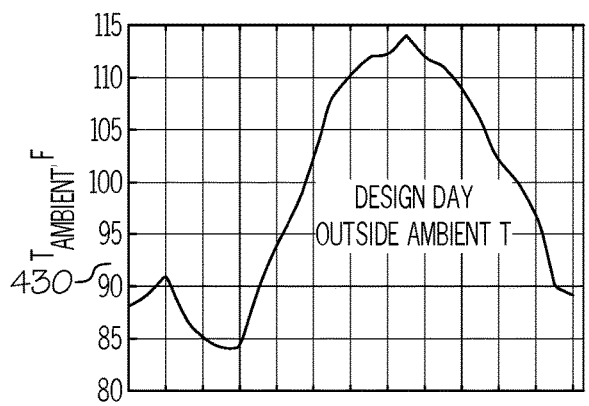
FIG. 4C is a graph of sizing the correct cooling system for a 24 period during the hottest day, according to one aspect of the present invention.
Figure 4C:
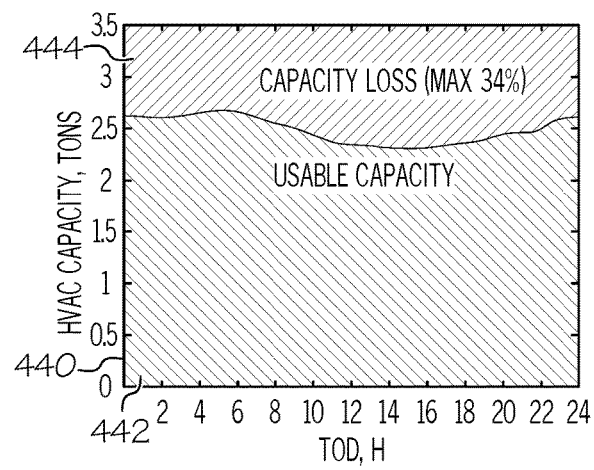

FIG. 4A is a model 410 of a total cooling load with the sub-components for an enclosed space in a BESS 110. This enclosed space of the BESS 110 is where the temperature must be controlled depending on various factors, including the total cooling load. The total cooling load includes sub-components that influence the temperature inside the enclosed space. These sub-components include transmission (such as heat from the sun) 412, heat from batteries 414, heat devices 416, such as from fan motors, heat from lights, heat from controls. FIG. 4B is a graph 420 of outside ambient of temperature fluctuations over a twelve-month period for a given geographic area. FIG. 4C is a graph 430 on the top right is how the present invention sizes the correct cooling system for a 24 period during the hottest day. The graph on the bottom right 440 is a thermal capacity cooling system illustrating that it is not 100% efficient with usable capacity 442 and a capacity loss 444 for any cooling system. The input for the model 410 includes outside ambient temperature, enclosure temperature, operating thermal properties of the batteries, and the heat generation of the batteries, both of which are provided by the manufacturer. The output of the total cooling model 410 is the duty cycle of how frequently a cooling system (curve 530 described below) is turned on to cool the enclosure due to the sub-components that influence the internal temperature, such as the battery, the battery cell temperature, and the internal ambient temperature inside the enclosure.

Figure 5:
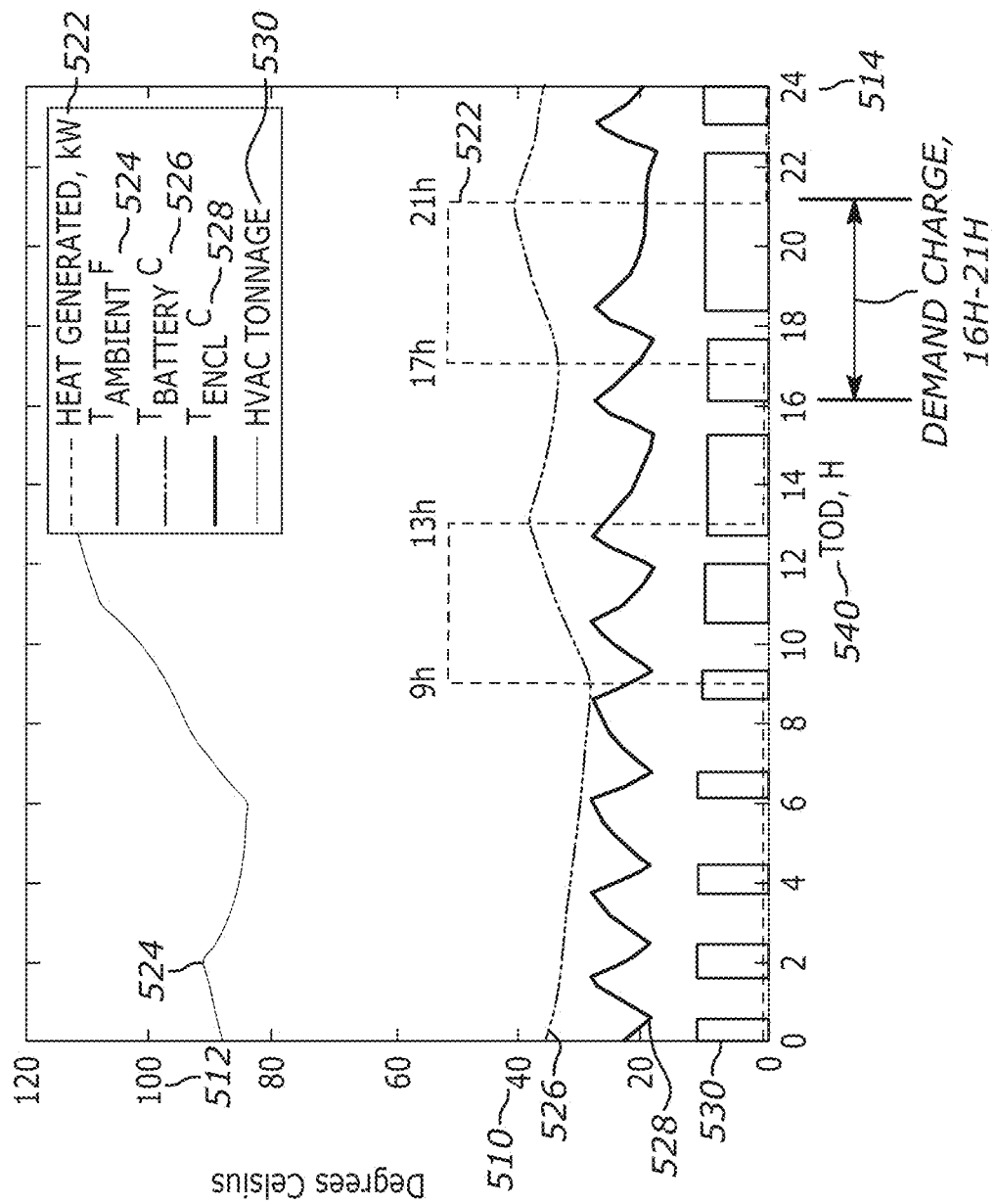
FIG. 5 uses the model of FIG. 4 to show the duty cycle of one cooling system, according to one aspect of the present invention.

FIG. 5 uses the model of FIG. 4 to show the duty cycle of one cooling system, according to one aspect of the present invention. The Y-axis is degrees Celsius 510, 512. The X-axis is hours in 24-hour format for time of day (TOD) 514, 540. The enclosure's internal temperature for the BESS 110 is the 528. The ambient outside temperature of the enclosure is 526. The temperature of one or more cells of the batteries in the BESS 110 is the 524. The heat generated from sub-components inside the enclosure is the 522. The duty cycle of the cooling system is the 530. In this example, the cooling system is an AC unit measured in tonnage. A ton, as used in the heating, ventilation, and air conditioning (HVAC) field, is a term that describes how much heat the AC unit can remove from a home in one hour. The measurement for heat is the British thermal unit (BTU). One ton of air conditioning can remove 12,000 BTUs of air per hour. The battery is charging between 9 AM and 1 PM and discharging from 5 PM to 9 PM.

Notice that the enclosure temperature 528 is correlated with the cooling system curve 530. Stated differently, when the cooling system 530 is ON, the temperature inside enclosure 528 decreases. Likewise, when the cooling system 530 is OFF cycle, the temperature inside enclosure 528, starts climbing back again. This is the sawtooth shape. The square duty cycle of the cooling system 530 is coining after the peak ON cycle of the temperature inside enclosure 110, 112, 114. The peak represents the temperature inside the enclosure 110, 112, 114, the permissible upper level of the ambient temperature of the container itself. Continuing further, the ambient outside temperature curve 524 just shows how the ambient temperature varies throughout the day, through that 24-hour time period, outside of the container. Now the heat generated from sub-components, especially batteries, is shown in curve 522. The sub-components, especially the batteries, are generating heat during discharge between 9 hours (9 AM) and 13 hours (1 PM) and 17 hours (5 PM) and 21 hours (9 PM). In this example, the batteries are discharged over a four (4) hour system, then resting and charging for a total of four (4) hours in between. It is important to note that other discharge periods other than four (4) hours are also applicable to the present invention. In this example, the batteries are discharged between 17 hours (5 PM) and 21 hours (9 PM). The model inputs include the ambient outside temperature 526. The manufacturer of the battery provides the thermal property for the batteries inside the BESS 110. The thermal properties of the batteries include the upper temperature and lower operating limits of the battery, the heat generated by the battery during charging, and the heat generated by the battery during discharging. These manufacturer provides thermal properties for the batteries are also inputs to the model. The output of the model includes the duty cycle of the cooling system. Other inputs to the model include the measured cell temperature of the battery 524, the measured ambient temperature 526, the internal ambient temperature 528 of the air inside the container.

Now scaling this concept to a typical electric energy center 100, such a location could have hundreds of batteries at a site over dozens of BESSs, each with an associated cooling system. One embodiment of the present invention to group those BESSs. In this example, we will use one-hundred (100) BESSs and divide them into four (4) different blocks or groupings. Each block will have twenty-five (25) containers, and each of the four (4) blocks can control each block individually. Now, if only run one (1) of the four (4) blocks, this represents twenty-five percent of the cooling systems. It is important to note that the present invention applies to electric energy centers with more or less BESSs, each with an associated cooling system.

Staggered Run Times of Cooling Systems

The present invention provides an opportunity to optimize the energy consumption based on modeling the thermal characteristics of the BESS. Based on the battery manufacturer's specification, in this example, the internal temperature 528 must be maintained the container between eighteen (18) degrees Celsius and twenty-eight (28) degrees Celsius. This range is considered along with the cooling capacity (typically measured in tons) of the HVAC system or cooling system associated with a given BESS. The present invention turns OFF the cooling systems assigned to one block and allows the temperature to rise until a settable point before turning the cooling system back ON. By sequentially turning ON and OFF groupings or blocks of cooling systems associated with BESSs, not all the cooling systems operate simultaneously.

Figure 6A:
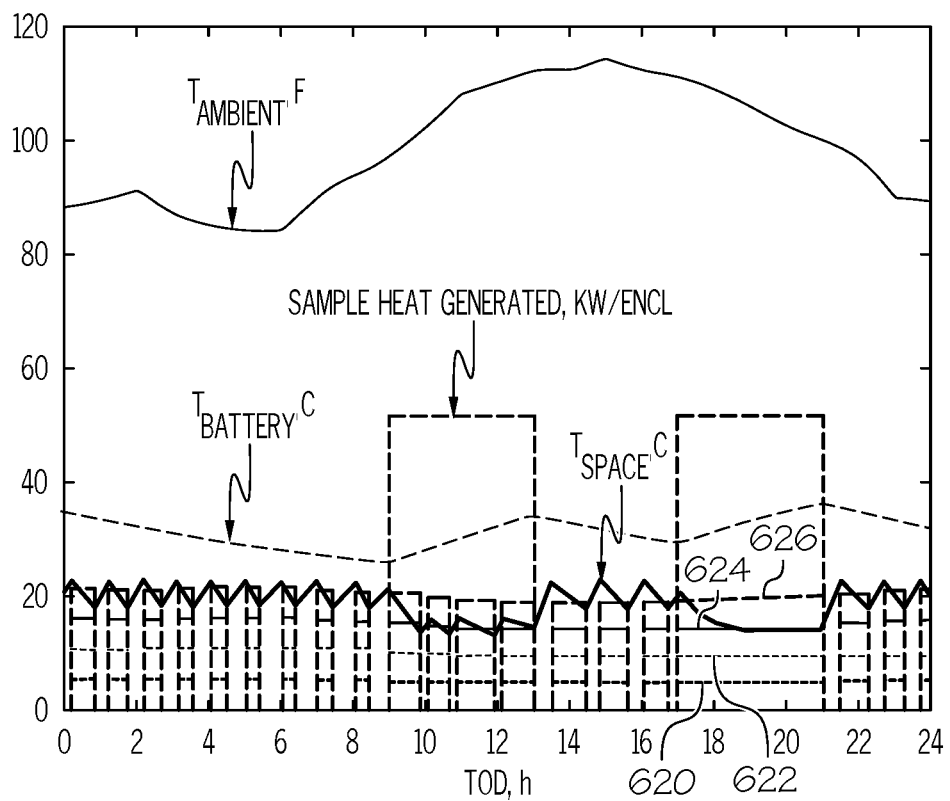
FIG. 6A is a graph of the conventional or prior art approach without staggering and FIG. 6B is a graph that illustrates the approach of using staggering, according to one aspect of the present invention.
Figure 6B:
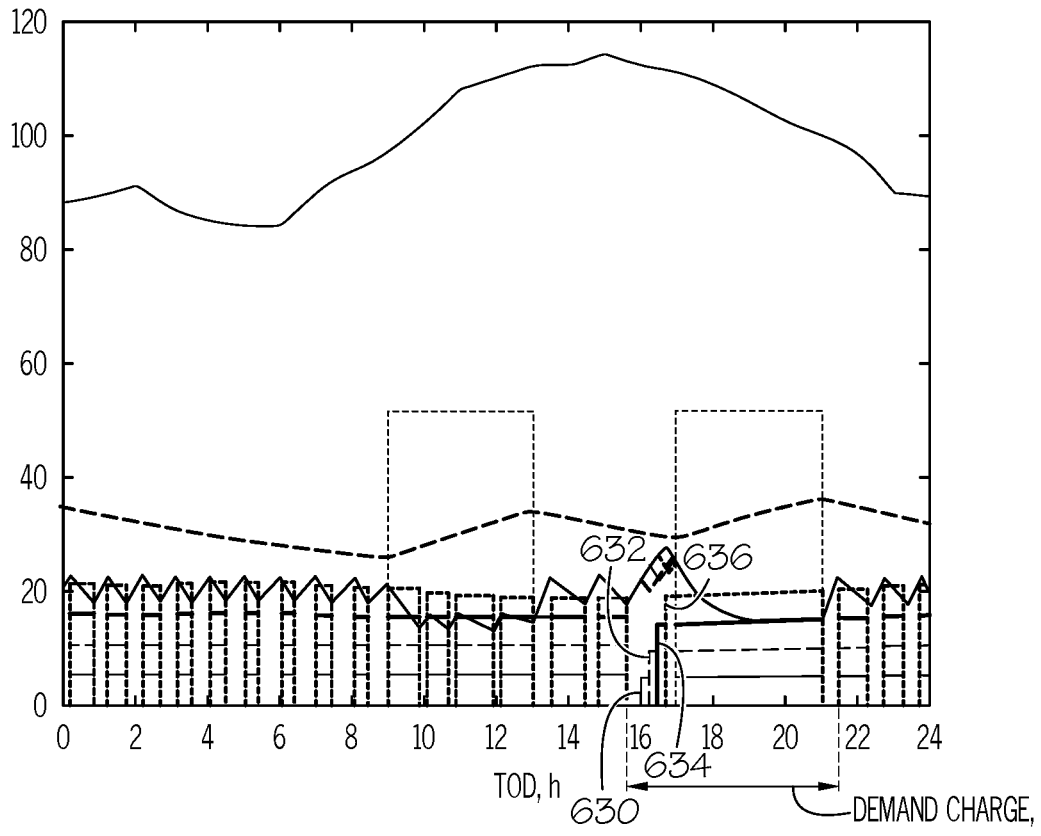

Turning to two graphs, shown in FIG. 6A is a graph illustrating a conventional or prior art approach without staggering and FIG. 6B is a graph that illustrates using staggering, according to one aspect of the present invention. The Y-axis is degrees Celsius, and the X-axis is hours in 24-hour format.

Shown are four square waves 630, 632, 634, and 636 to represent four (4) distinct BESS 110, e.g., BESS 112, BESS 114, etc. These four square waves, 630, 632, 634, and 636, represent different cooling systems operating on the same duty cycle. Instead of collapsing all four (4) duty cycles in one single curve, in this example, they are just given distinct numerical values to differentiate them.

Review the period of time between 16 hours (4 PM) and 21 hours (9 PM). In FIG. 6A the plot on the left is at 16 hours (4 PM), which results in nearly identical duty cycles of the four square waves 620, 622, 624, 626 across all the four (4) cooling systems.

On FIG. 6B, referring to the plot at 16 hours (4 PM), the duty cycle shifts by about 15 minutes through that hour. This graph in FIG. 6B illustrates turning ON and turning OFF each cooling system sequentially associated with one of these four individual blocks between 16 hours (4 PM) and 17 hours (5 PM).

In this example, the electric energy center 100 is subjected to demand charge time limits. At 16 hours (4 PM), the demand is near 20 degrees Celsius in FIG. 6A, whereas in FIG. 6B, the staggering demand load is closer to 5 degrees Celsius. This is shown further with reference to FIG. 7.

Figure 7A:
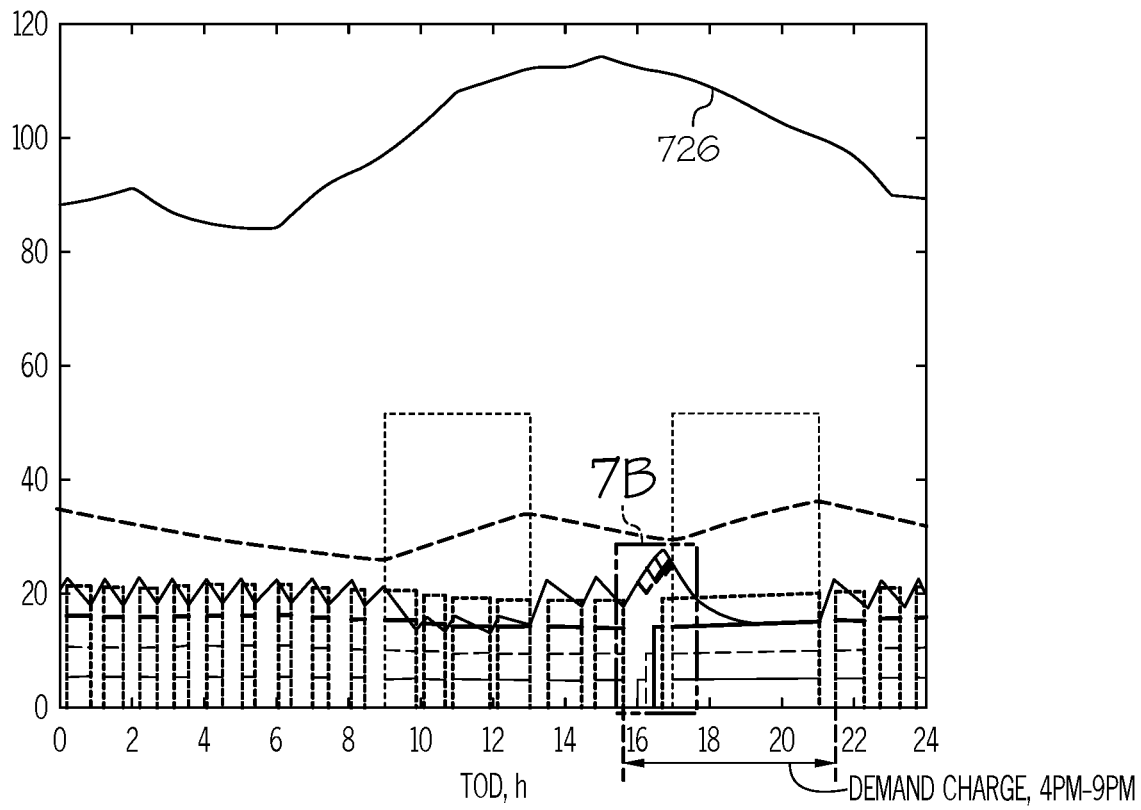
FIG. 7A is another view of the righthand side of FIG. 6B, according to one aspect of the present invention.
Figure 7B:
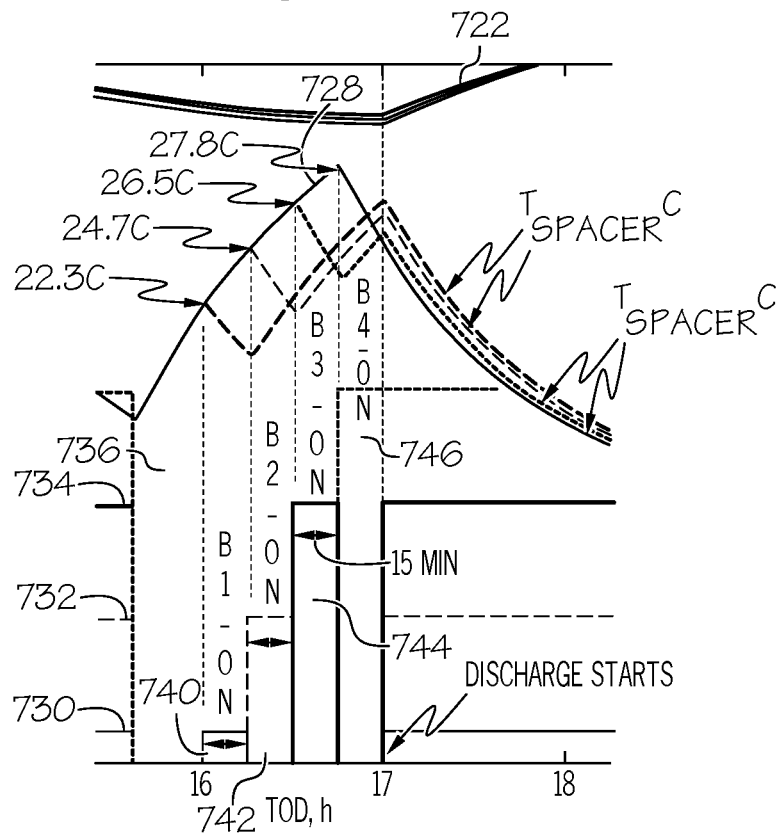
FIG. 7B is a detailed view of FIG. 7A between 4 PM (16 h) and 6 PM (18 h), according to one aspect of the present invention.

FIG. 7A is another view of the of FIG. 6B and FIG. 7B is a detailed view of FIG. 7A between 4 PM (16 h) and 6 PM (18 h), according to one aspect of the present invention. In this FIG. 7A and FIG. 7B in order to represent four (4) distinct BESS 110, e.g., BESS 110, BESS 112, BESS 114, etc., shown are four square waves 730, 732, 734, and 736, each of which represent different cooling systems.

The staggering of the duty cycles is shown by dividing all the BESS into non-overlapping blocks. On the left side, the curve line 726 is the outside ambient temperature. The curve 728 on the right side is the aggregate internal temperature of all blocks. The top line 722 on the right side is battery cell temperature. Here B1 is block 1 740, B2 is block 2742, B3 is block 3 744, and B4 is block 4 746. At 17 hours (5 PM), the batteries discharge starts, and all the cooling is called into service to drop the temperature down. The present invention applies its algorithm at 16 hours (4 PM) when the temperature across all the BESSs in each of the four (4) groups is about 22.3 degrees Celsius. All the cooling systems associated with BESSs in Block 1 (B1) 740 are turned ON for 15 minutes. No other cooling systems associated with any other BESS in Block 2 742, Block 3 744, and Block 4 746 are turned ON. This caused the internal temperature for Block 1 to decrease, as shown from about 22.3 Celsius to about 20 degrees Celsius. During this time duration, the temperatures of Bock 2 742, Block 3 744, and Block 4 746 continue to rise higher. Then at 16:15 hours (4:15 PM) the cooling systems associated with Block 1 are turned OFF; Block 3 744 and Block 4 746 continue to remain turned OFF while Block 2 742 is turned ON for 15 mins. Then at 16:30 hours (4:30 PM), the cooling systems associated with Block 2742 are turned OFF. As a result, the aggregate temperature for BESSs with their associated cooling systems turned OFF will continue to rise higher, with the maximum reaching 26.5 Celsius. At 16:30 hours (4:30 PM), cooling systems associated with BESSs in Block 3 (B3) 744 are turned ON for 15 minutes. Again, no other cooling systems associated with any other BESS in Block 1 740, Block 2 742, and Block 4 746 are turned ON. Then at 16:45 hours (4:45 PM), the cooling systems associated with Block 3 744 are turned OFF. As a result, the aggregate temperature for BESSs with their associated cooling systems turned OFF will continue to rise higher. The maximum reaches 27.8 degrees Celsius, which is below the 28 degrees Celsius set by the battery manufacturer. At 16:45 hours (4:45 PM), cooling systems associated with BESSs in Block 4 (B4) 746 are turned ON for 15 minutes. Again, no other cooling systems associated with any other BESS in Block 1 740, Block 2742, and Block 3 744 are turned ON. Then at 17 hours (5 PM), the cooling systems associated with Block 4 continue to stay ON. At 17:00 hours (5:00 PM), the cooling systems associated with each BESS in all four blocks are turned ON as the battery discharge to the power grid 160 is turned ON.

By using this staggered non-overlapping control of cooling systems associated with each block, the present invention does not exceed the operating limit of the batteries. Rather, just in time, the present invention turns on the cooling system for a particular block, and it starts dropping back again. At 17:00 hours (5:00 PM), the battery discharge starts, and all the cooling systems are called into service to drop the temperatures down because the batteries in each BESS are generating heat during the discharge cycle.

At 17:00 hours (5:00 PM), the discharge cycle for the electric energy center 100 starts. Curve 722 represents the temperature of sub-components, especially the batteries that are generating heat. Notice that there appears to be only one curve, 722, for the four (4) blocks. The reason is the temperature of the sub-components for each of the four (4) blocks overlaps with each other to appear as a single curve. Note again that the sub-component temperature is below the battery manufacturer's specification for battery cell temperature for each battery in each BESSs for each block.

Cost Savings of Staggered Run Times of Cooling Systems

Figure 8A:
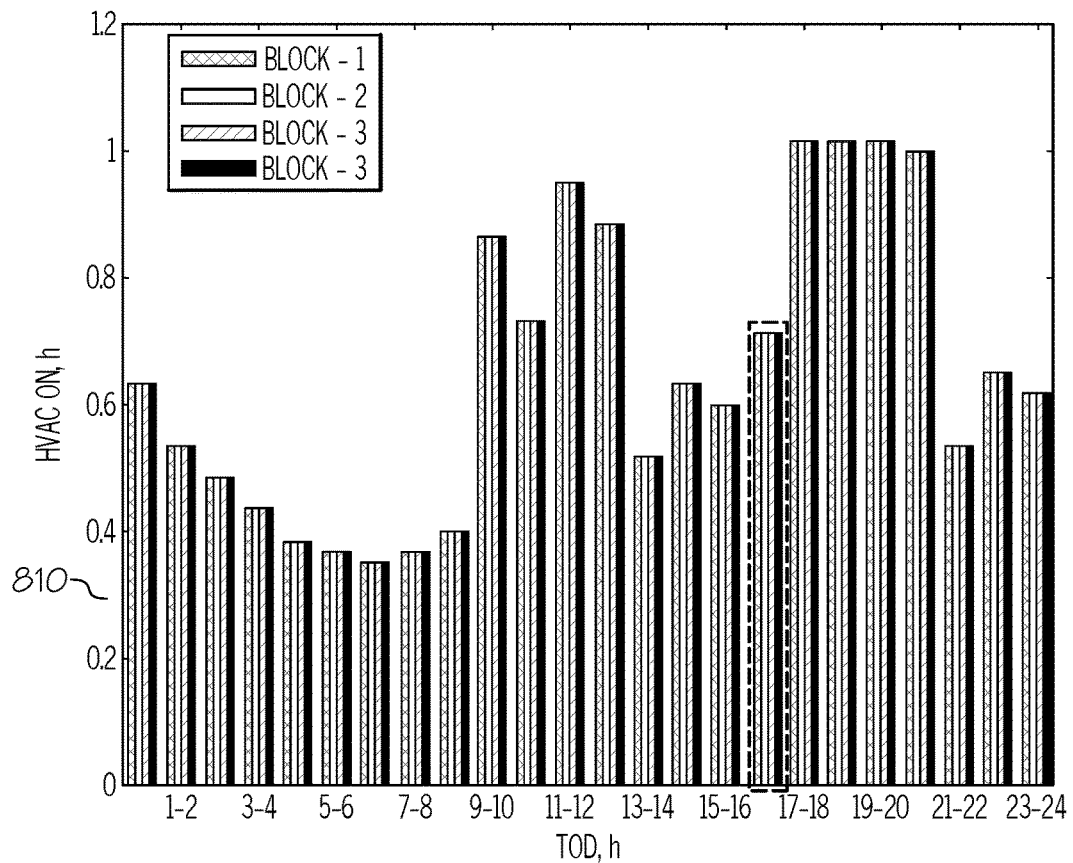
FIG. 8A is a graph illustrating the costs of the traditional approach according to one aspect of the present invention.
Figure 8A:
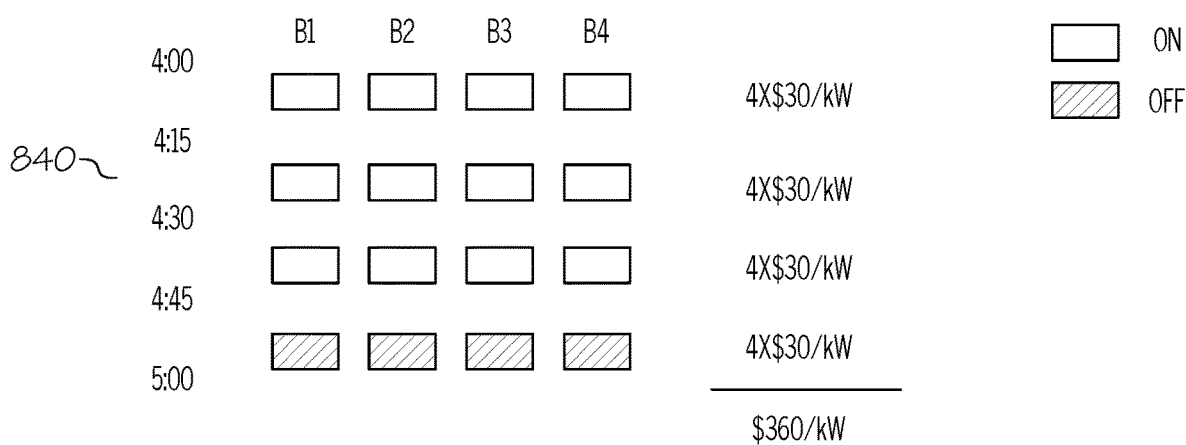
Figure 8B:
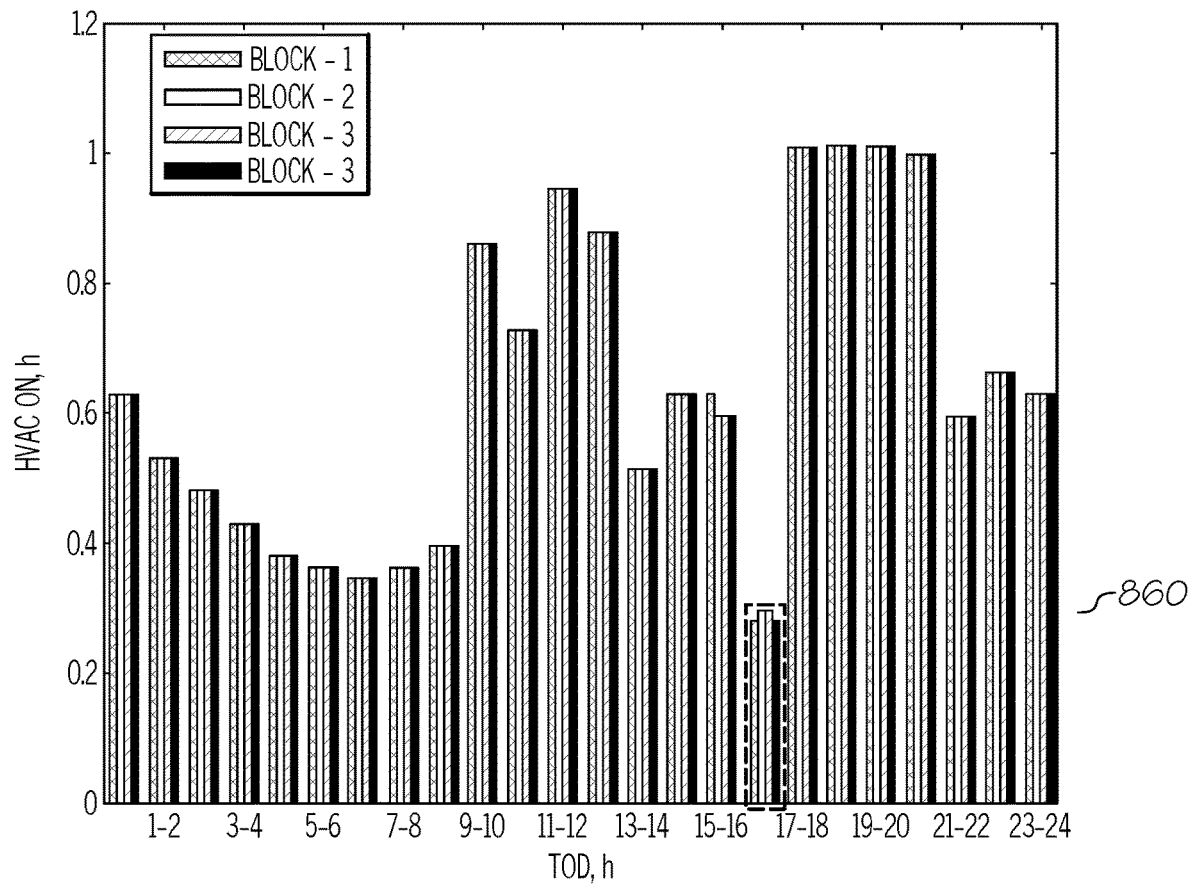
FIG. 8B of the cost-savings realized using the staggering approach, according to one aspect of the present invention.
Figure 8B:
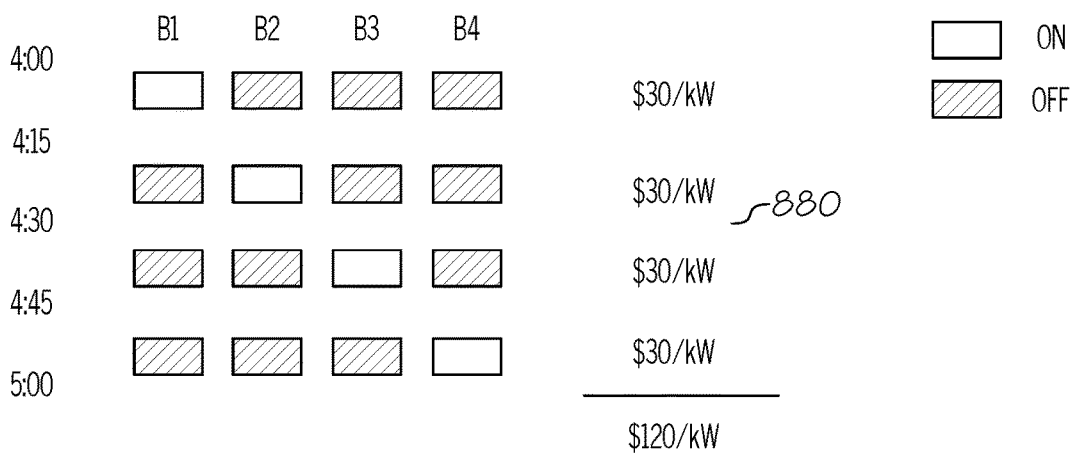

FIG. 8A is a graph illustrating the costs of the traditional approach and FIG. 8B are the cost-savings realized using the staggering approach, according to one aspect of the present invention. The Y-axis 810 is time in hours, and the X-axis is hours in 24-hour format. The length of the bars illustrates the length of time the cooling system is running for each associated BESSs at a given electric energy center 100. For example, focusing on 16 hours (4 PM) to 17 hours (5 PM), the height of the bar is close to approximately 0.75 of an hour or approximately 45 minutes for all the cooling systems associated with each BESS at the electric energy center 100 is running.

In FIG. 5A, there is an example scenario between 16 hours (4 PM) to 17 hours (5 PM) 840, and when batteries are idle, the cooling load for the entire electric energy center 100 is approximately 1.596 megawatt which is approximately 21 kilowatt/container for seventy-six (76) BESSs. Now, referring to FIG. 8B, here is a graph 860 in which the electric energy center 100 is split into four (4) blocks with nineteen (19) containers, each resulting in each block requiring approximately 399 kilowatts. By sequencing the cooling operation as described above in FIG. 7B, the cooling system load stays below the 500 kilowatts limit over a 15-minute time period 880, thereby circumventing the demand charge time limits. Without the staggering control approach, powering all the cooling systems for each BESS load of approximately 1.596 megawatts will trigger the demand charges at approximately $32/kilowatt.

Grouping of BESSs Into Blocks

Each power supplier for each electric energy center 100 will have its own demand charge parameters. For example, an electric utility may have a parameter that demand charges will apply for each 15-minute duration if the cooling systems' power consumption for all BESSs exceeds 500 kilowatts. This is one factor used for grouping the BESSs into blocks using the model of total cooling load in FIG. 4A. The BESSs are grouped to a point where they don't exceed 500 kilowatts over a 15-minute interval.

Next, using the model of the total cooling load in FIG. 4A, the system determines that 15-minute window does not exceed the threshold of 28 degrees Celsius for the heat from batteries 414. If the heat generated is not above the threshold, then the time period is made smaller than 15 minutes.

The operating time of the cooling system for each BESS is adjusted based on the battery manufacturer. Variable such as outside temperature does not matter for the initial grouping. The outside temperature is used for the duty cycle of the cooling system.

Once the BESSs are divided, only the length of the cooling system on the window typically varies. Factors such as battery suppliers providing authorization to cool more than the lower threshold while cycling the charge/discharge cycle would change the grouping.

The HVAC units of the individual blocks are staggered to turn on and off with a time delay. If the demand load exceeds a certain threshold, it is automatically turned OFF. No blocks are operating at the same time. Staggering is based on real-time monitoring and has an internal temperature that cannot exceed the manufacturer's specification.

Figure 9:
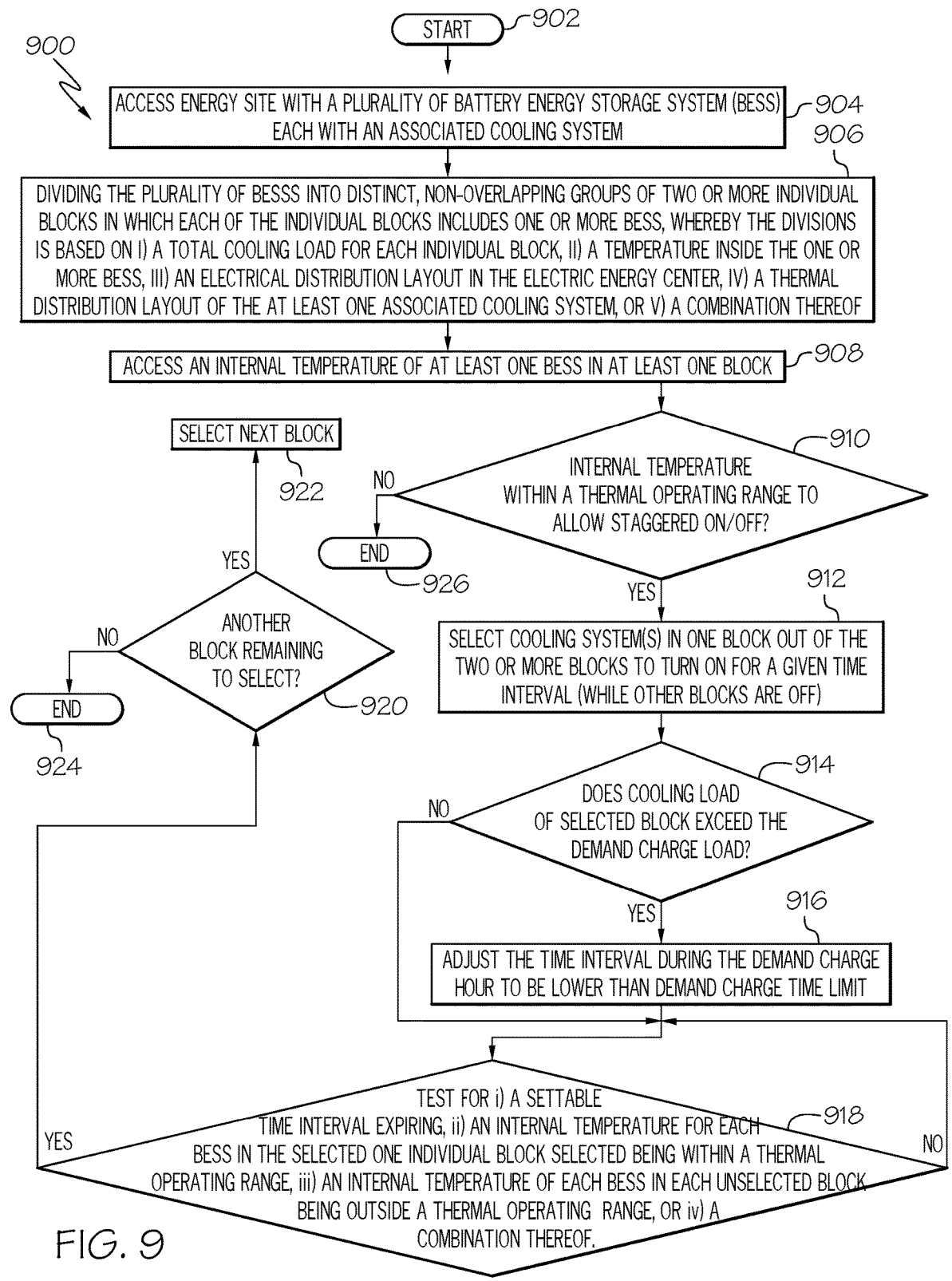
FIG. 9 is a flow diagram 900 of the major process for staggering the cooling, according to an example.

FIG. 9 is a flow diagram 900 of the major process for staggering the cooling, according to an example. From a high-level, the present invention provides a novel method and system for smart control of cooling battery energy storage systems (BESSs) to optimize cooling utilization such that demand charges can be avoided. The method begins with accessing an electric energy center with a plurality of BESSs, each with an associated cooling system. Next, the associated cooling system for at least one of the plurality of BESSs is turned ON for a settable time interval, where the settable time interval is based on a demand charge time limit. Typically, the demand charge time limit is specified by an electric utility provider for a site with a plurality of BFSSs. The demand charge time limit changes depending on one of a time of day, a day of a year, outside ambient temperature, or a combination thereof. Finally, the associated cooling system is turned OFF for another settable time interval.

The process starts at step 902 and immediately proceeds to step 904. In step 904, access to data from electric energy center 100 is performed with a plurality of battery energy storage systems (BESSs) 110, 112, 114, each with an associated cooling system 130, 132, 134. In one example, the data is accessed through the energy management system 370, as shown in FIG. 3. The process continues to step 906.

In step 906, the plurality of BESSs 110, 112, 114 are divided into a plurality of BESSs into distinct, non-overlapping groups of two or more individual blocks in which each of the individual blocks includes one or more BESS, whereby the divisions is based on i) a total cooling load for each individual block, ii) a temperature inside the one or more BESS, iii) an electrical distribution layout in the electric energy center, iv) a thermal distribution layout of the at least one associated cooling system, or v) a combination thereof. The process continues to step 908.

In step 908, the internal temperature of at least one BESS in at least one block is accessed. The process continues to step 910, in which a test is made to see if the internal temperature is within a thermal operating range to allow staggered On/Off. In the event, the internal temperature is not in the range, i.e., too high "No", the process ends in step 926. Otherwise, in the event, the temperature is within range "Yes", the process continues to step 912.

In step 912, one or more cooling system(s) in one block out of the two or more blocks are turned on for a given time interval, while cooling systems associated with the other blocks are off. The process continues to a second test in step 914.

In step 914, a test is made to determine if the cooling load of the selected block exceeds the demand load. If the determination is "Yes", the process continues to step 916. Otherwise, if the answer is "No" the process continues directly to step 918, as shown.

In step 918, a third test is made to determine if a test for i) a settable time interval expiring, ii) an internal temperature for each BESS in the selected one individual block selected being within a thermal operating range, iii) an internal temperature of each BESS in each unselected block being outside a thermal operating range, or iv) a combination thereof. If the determination is "Yes", the process continues to step 918. Otherwise, if the answer is "No" the process loops back to step 918, as shown.

In step 920, a fourth test is made to determine if another block is remaining to select. If the determination is "Yes", the process continues to step 922, in which another block is selected and returns to step 910. Otherwise, if the answer is "No" the process ends in step 924.

General Computer for Implementing Algorithm

Figure 10:
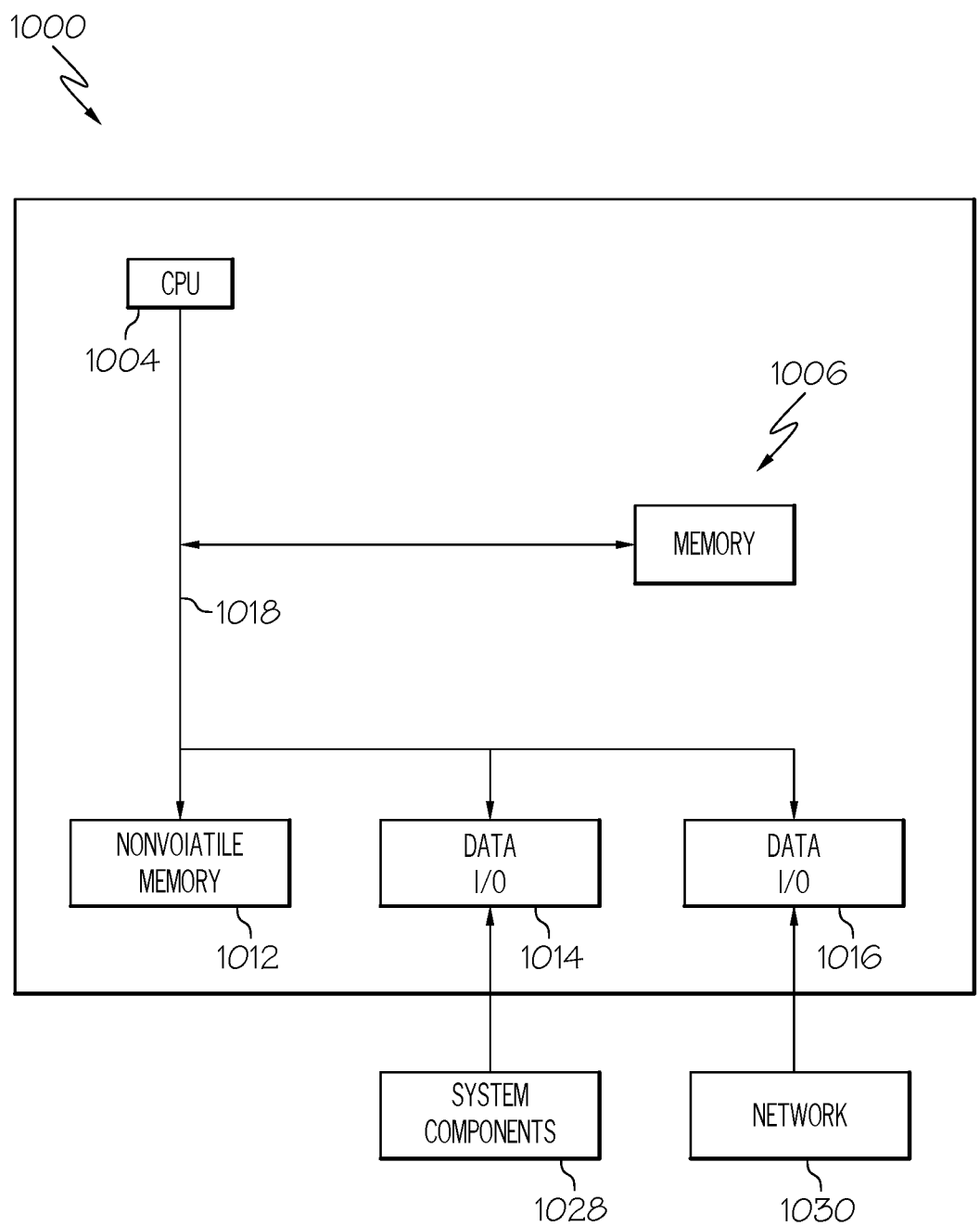
FIG. 10 illustrates a block diagram illustrating a processing system for carrying out portions of the present invention, according to an example.

FIG. 10 illustrates a block diagram illustrating a processing system 1000 for carrying out a portion of the present invention, according to an example. The processor system 1000 is an example of a processing subsystem that is able to perform any of the above-described processing operations, control operations, other operations, or combinations of these, such as the energy control system 240 and the energy management system 370.

The processor 1000 in this example includes a hardware processor or CPU 1004 that is communicatively connected to a main memory 1006 (e.g., volatile memory), a non-volatile memory 1012 to support processing machine instruction and operations. The CPU is further communicatively coupled to a network adapter hardware 1016 to support input and output communications with external computing systems such as through the illustrated network 1030.

The processor 1000 further includes a data input/output (I/O) processor 1014 that is able to be adapted to communicate with any type of equipment, such as the illustrated system components 1028. The data input/output (I/O) processor, in various examples, is able to be configured to support any type of data communications connections, including present-day analog and/or digital techniques or via a future communications mechanism. A system bus 1018 interconnects these system components.

Information Processing System

The present subject matter can be realized in hardware, software, or a combination of hardware and software. A system can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general-purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code, or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory. CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes are made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A computer-implemented method for managing an electric energy center with a plurality of battery energy storage systems (BESSs), the method comprising:
    accessing the electric energy center with the plurality of BESSs, each with an associated cooling system;
    dividing the plurality of BESSs into distinct, non-overlapping groups of two or more individual blocks in which each of the individual blocks includes one or more BESS, whereby the divisions are based on one of:
        i) a total cooling load for each individual block,
        ii) a temperature inside the one or more BESS,
        iii) an electrical distribution layout in the electric energy center,
        iv) a thermal distribution layout of the associated cooling system, or
        v) a combination thereof:
    accessing an internal temperature of at least one BESS in each of the distinct, non-overlapping groups of the two or more individual blocks;
    in response to the internal temperature of the at least one BESS in each of the distinct, non-overlapping groups of the two or more individual blocks being within a thermal operating range, selecting one individual block out of the two or more individual blocks;
    turning on the associated cooling system for the one individual block selected for a settable time interval, wherein the settable time interval is based on a demand charge time limit; and
    turning off the associated cooling system of individual blocks of the two or more individual blocks not selected for another settable time interval.

2. The computer-implemented method of claim 1, wherein the associated cooling system is at least one of AC units, evaporative coolers, geothermal cooling, forced ventilation, heat exchangers, chilled water, liquid systems, or a combination thereof.

3. The computer-implemented method of claim 1, wherein the demand charge time limit is specified by an electric utility provider for a site with the plurality of BESSs.

4. The computer-implemented method of claim 1, wherein the demand charge time limit changes depending on one of a time of day, a day of a year, outside ambient temperature, or a combination thereof.

5. The computer-implemented method of claim 1, further comprising:
  determining if a cooling electrical load associated with turning on the at least one associated cooling system for the one individual block selected exceeds the demand load; and
  in response to the cooling electrical load exceeding the demand load, adjusting the settable time interval to turning off the at least one associated cooling system with the one individual block selected to be less than the demand load.

6. A computer-implemented method for managing an electric energy center with a plurality of battery energy storage systems (BESSs), the method comprising:
  a) accessing the electric energy center with the plurality of BESSs, each with at least one associated cooling system;
  b) dividing the plurality of BESSs into distinct, non-overlapping groups of two or more individual blocks in which each of the individual blocks includes one or more BESS, whereby the divisions are based on one of:
    i) a total cooling load for each individual block,
    ii) a temperature inside the one or more BESS,
    iii) an electrical distribution layout in the electric energy center,
    iv) a thermal distribution layout of the at least one associated cooling system, or
    v) a combination thereof;
  c) accessing an internal temperature of at least one BESS in each of the distinct, nonoverlapping groups of the two or more individual blocks;
  d) in response to the internal temperature of the at least one BESS in each of the distinct, non-overlapping groups of the two or more individual blocks being above the thermal operating range, operating the at least one associated cooling system until the internal temperature is within the thermal operating range prior to operating each of the individual blocks;
  e) in response to the internal temperature of the at least one BESS in each of the distinct, non-overlapping groups of the two or more individual blocks being within a thermal operating range, selecting one individual block out of the two or more individual blocks;
  f) turning on the at least one associated cooling system for the one individual block selected, while the at least one associated cooling system for each non-selected individual block is off; and
  g) turning off the at least one associated cooling system with the one individual block selected, in response to
  i) a settable time interval expiring,
  ii) an internal temperature for each BESS in the selected one individual block being within a thermal operating range,
  iii) an internal temperature of each BESS in each unselected individual block being outside a thermal operating range, or
  iv) a combination thereof.

7. The computer-implemented method of claim 6, further comprising:
  repeating steps b through g for each subsequent cooling activity.

8. The computer-implemented method of claim 6, wherein in step b, the dividing the plurality of BESSs into the distinct, non-overlapping groups of the two or more individual blocks is further based on a total cooling load being less than a demand charge time limit.

9. The computer-implemented method of claim 6, wherein in step b, the dividing the plurality of BESSs into the distinct, non-overlapping groups of the two or more individual blocks is further based on including a sub-set of the two or more individual blocks.

10. The computer-implemented method of claim 6, wherein in step b, the electrical distribution layout in the electric energy center is based on breakers, feeders, load centers, one or more electrical devices that distributes electricity at the electric energy center, or a combination thereof.

11. The computer-implemented method of claim 6, wherein in step b, the thermal distribution layout of the at least one associated cooling system is based on liquid cooling zones, forced air cooling zones, or a combination thereof.

12. The computer-implemented method of claim 6, wherein in response to the settable time interval expiring, turning off the associated cooling system with the one individual block selected and selecting another block in the distinct, non-overlapping groups of the two or more individual blocks and repeating step b and step e.

13. The computer-implemented method of claim 6, wherein the at least one associated cooling system is at least one of AC units, evaporative coolers, geothermal cooling, forced ventilation, heat exchangers, chilled water, liquid systems, or a combination thereof.

14. The computer-implemented method of claim 6, wherein a demand charge time limit is specified by an electric utility provider for a site with the plurality of BESSs.

15. The computer-implemented method of claim 6, wherein a demand charge time limit changes depending on one of a time of day, a day of a year, outside ambient temperature, or a combination thereof.

16. The computer-implemented method of claim 6, further comprises:
  determining if a cooling electrical load associated with turning on the at least one associated cooling system for the one individual block selected exceeds the demand load; and
  in response to the cooling electrical load exceeding the demand load, adjusting the settable time interval to turning off the at least one associated cooling system with the one individual block selected to be less than the demand load.

17. A system for managing an electric energy center with a plurality of battery energy storage systems (BESSs), the system comprising:
  a computer memory capable of storing machine instructions; and
  a hardware processor in communication with the computer memory, the hardware processor configured to access the computer memory to execute the machine instructions to perform:
    a) accessing the electric energy center with the plurality of BESSs, each with at least one associated cooling system;
    b) dividing the plurality of BESSs into distinct, non-overlapping groups of two or more individual blocks in which each of the individual blocks includes one or more BESS, whereby the divisions are based on one of:
      i) a total cooling load for each individual block,
      ii) a temperature inside the one or more BESS,
      iii) an electrical distribution layout in the electric energy center, iv) a thermal distribution layout of the at least one associated cooling system, or
v) a combination thereof;
c) accessing an internal temperature of at least one BESS in each of the distinct, non-overlapping groups of the two or more individual blocks;
d) in response to the internal temperature of the at least one BESS in each of the distinct, non-overlapping groups of the two or more individual blocks being above the thermal operating range, operating the at least one associated cooling system until the internal temperature is within the thermal operating range prior to operating each of the individual blocks;
f) in response to the internal temperature of the at least one BESS in each of the distinct, non-overlapping groups of the two or more individual blocks being within a thermal operating range, selecting one individual block out of the two or more individual blocks;
g) turning on, the at least one associated cooling system for the one individual block selected, while the at least one associated cooling system for each non-selected individual block is off; and
f) turning off the at least one associated cooling system with the one individual block selected, in response to:
i) a settable time interval expiring,
ii) an internal temperature for each BESS in the selected one individual block being within a thermal operating range,
iii) an internal temperature of each BESS in each unselected block being outside a thermal operating range, or
iv) a combination thereof.

18. The system of claim 17, wherein the hardware processor is further configured to perform:
repeating steps b through g for each subsequent cooling activity.

19. The system of claim 17, wherein in step b, the dividing the plurality of BESSs into the distinct, non-overlapping groups of the two or more individual blocks is further based on a total cooling load being less than a demand load.

20. The system of claim 17, further comprises
determining if a cooling electrical load associated with turning on, the at least one associated cooling system for the one individual block selected exceeds the demand load; and
in response to the cooling electrical load exceeding the demand load, adjusting the settable time interval to turning off the at least one associated cooling system with the one individual block selected to be less than the demand load.

* * * * *